(12) United States Patent
Chu

(10) Patent No.: US 8,966,006 B2
(45) Date of Patent: Feb. 24, 2015

(54) DATA TRANSFER APPARATUS AND METHOD

(75) Inventor: Jeong Hun Chu, Seoul (KR)

(73) Assignee: LSIS Co., Ltd., Anyang-Si, Gyeonggi-Do (KR)

( * ) Notice: Subject to any disclaimer, the term of this patent is extended or adjusted under 35 U.S.C. 154(b) by 377 days.

(21) Appl. No.: 13/413,575

(22) Filed: Mar. 6, 2012

(65) Prior Publication Data

US 2012/0233289 A1    Sep. 13, 2012

(30) Foreign Application Priority Data

Mar. 8, 2011    (KR) .................. 10-2011-0020663

(51) Int. Cl.
G06F 15/16    (2006.01)
G06F 1/26    (2006.01)

(52) U.S. Cl.
CPC .................................. *G06F 1/26* (2013.01)
USPC .............. 709/217; 363/95; 307/151; 700/297

(58) Field of Classification Search
CPC ......... H02J 3/383; H02J 3/18; H02J 13/0017; H02J 7/35; Y02E 40/30; Y02E 40/72; Y02E 40/74; Y02E 60/7807; Y02E 10/563; Y04S 10/123; Y04S 10/22; Y04S 40/12
USPC ............... 709/217; 363/95; 307/151
See application file for complete search history.

(56) References Cited

U.S. PATENT DOCUMENTS

| | | | |
|---|---|---|---|
| 8,076,802 B2 * | 12/2011 | Fornage | 307/151 |
| 8,478,452 B2 * | 7/2013 | Pratt et al. | 700/297 |
| 2008/0055949 A1 * | 3/2008 | Noda et al. | 363/95 |

FOREIGN PATENT DOCUMENTS

| | | |
|---|---|---|
| CN | 101295933 | 10/2008 |
| CN | 201282342 | 7/2009 |
| CN | 201373895 | 12/2009 |
| CN | 101797752 | 8/2010 |
| CN | 101807080 | 8/2010 |
| JP | 4023171 | 12/2007 |

OTHER PUBLICATIONS

The State Intellectual Property Office of the People's Republic of China Application Serial No. 201210116110.5, Office Action dated Jun. 3, 2014, 8 pages.

* cited by examiner

*Primary Examiner* — Kyung H Shin
(74) *Attorney, Agent, or Firm* — Lee, Hong, Degerman, Kang & Waimey

(57) ABSTRACT

Provided is a data transfer apparatus according to an embodiment of the present invention including: a power supply unit supplying operation power; a communication unit connected with an external apparatus and downloading inverter control data from the external apparatus; a memory storing the inverter control data downloaded by the communication unit; a connection unit connected to an inverter, transferring the inverter control data stored in the memory to the inverter, and supplying the operation power supplied through the power supply unit to the inverter; and a control unit allowing the operation power to be supplied to the inverter and allowing the inverter control data to be transferred to the inverter whenever the inverter is connected.

14 Claims, 6 Drawing Sheets

DATA TRANSFER APPARATUS AND METHOD

CROSS-REFERENCE TO RELATED APPLICATIONS

Pursuant to 35 U.S.C. §119(a), this application claims the benefit of earlier filing date and right of priority to Korean Patent Application No. 10-2011-0020663, filed on Mar. 8, 2011, the contents of which are hereby incorporated by reference herein in their entirety.

BACKGROUND

The present disclosure relates to a data transfer apparatus, and more particular, to an apparatus connected to an inverter and transferring firmware or setting values needed for the inverter and a transfer method thereof. More specifically, the present invention relates to a data transfer apparatus and method transferring data and also electric power to an inverter such that data can be transferred to the inverter even when the inverter is powered off.

For inverters which are used to drive motors and supply relevant driving voltages to loads, various setting values should be set before the use of the inverters.

In related art, accordingly, setting values are entered through key pads equipped with inverters, or setting values are preset and then transferred to inverters through a separated apparatus (for example, personal computer).

When setting values are entered or transferred to inverters, the inverters should be powered on to perform the functions.

In this case, special purpose applications for the connection with inverters should be installed in the separate apparatus. Furthermore, special purpose cables for the connection with the separate apparatus and communication converters according to a communication method should be prepared. In this case, in order to transferring the setting values, the separates apparatus and inverters should be located in a short distance. Therefore, this may result in much inconvenience in a case of transferring the setting value.

To set a plurality of inverters, a complex process of supplying power to each inverter and connecting a separate apparatus to each inverter should be repeated.

A method of transferring setting values through a personal computer cannot provide a function of transferring firmware programs required to drive inverters. Thus, to install firmware in the inverter, another separate apparatus should be connected thereto.

SUMMARY

Embodiments provide a data transfer apparatus and a data transfer method thereof, which can read and writer inverter setting values without a power supply process.

Embodiments also provide a data transfer apparatus and a data transfer method thereof, which can provide a function of downloading inverter firmware.

Embodiments also provide a data transfer apparatus and a data transfer method thereof, which can provide a function of storing inverter setting values and downloading inverter firmware even where power supply is difficult.

The technical object of the present invention is not limited to the aforesaid, but other objects not described herein will be clearly understood by those skilled in the art from descriptions below.

In one embodiment, a data transfer apparatus includes: a power supply unit supplying operation power; a communication unit connected with an external apparatus and downloading inverter control data from the external apparatus; a memory storing the inverter control data downloaded by the communication unit; a connection unit connected to an inverter, transferring the inverter control data stored in the memory to the inverter, and supplying the operation power supplied by the power supply unit to the inverter; and a control unit allowing the operation power to be supplied to the inverter and allowing the inverter control data to be transferred to the inverter whenever the inverter is connected.

In another embodiment, a data transfer method includes: connecting to an inverter; supplying operation power to the connected inverter; and transferring inverter control data to the inverter operated by the operation power.

The details of one or more embodiments are set forth in the accompanying drawings and the description below. Other features will be apparent from the description and drawings, and from the claims.

DETAILED DESCRIPTION OF THE EMBODIMENTS

Embodiments of the present invention will be described in detail.

Reference will now be made in detail to the embodiments of the present disclosure, examples of which are illustrated in the accompanying drawings. The spirit and scope of the present disclosure, however, shall not be construed as being limited to embodiments provided herein. Rather, it will be apparent that other embodiments that fall within the spirit and scope of the present disclosure may easily be derived through adding, modifying, and deleting elements herein.

These terms used in embodiments are widely and generally used at present times. However, in specific cases, the applicant has selected terms on one's own discretion and has defined the meaning thereof in detail in the descriptions. Thus, the present invention should be understood by not the original meanings but the given meanings of the terms.

That is, the meaning of "comprising" specifies an element or step listed in the description, but does not exclude other elements or steps.

In an embodiment of the present invention, setting values can be transferred or received to or from an inverter even when the inverter is powered off. In an embodiment of the present invention, firmware can be downloaded to the inverter powered off, thereby performing the maintenance of the inverter conveniently in various environments. In an embodiment of the present invention, setting values can be set to a plurality of inverters powered off, and thus manufacturers of inverters can reduce the setting time of the products.

Thus, according to the embodiments of the present invention, an error occurring time during the operation setting of an inverter can be reduced, thereby enhancing the reliability of the inverter.

Figure 1:
FIG. 1 is a view illustrating a method of receiving data from a PC 10 according to an embodiment of the invention.

FIG. 1 is a view illustrating a method of receiving data from an external apparatus, for example, PC 10 according to an embodiment of the invention.

As illustrated in FIG. 1, the data transfer apparatus 20 according to an embodiment of the present invention is connected to the external apparatus such as PC 10 and thus downloads data required to control an inverter, that is, inverter control data (also referred to as parameter).

The external apparatus may be replaced with another apparatus other than the PC 10. That is, the external apparatus can be replaced with any electronic apparatus capable of storing the inverter control data and transferring the inverter control data to the data transfer apparatus 20.

According to an embodiment of the present invention, the inverter control data may include setting values (parameters), for example, a frequency command value, a speed command value, driving type information, firmware data, and firmware update data of the inverter, which are required to be set before the use of the inverter.

The data transfer apparatus 20 is connected to the external apparatus (PC) 10 and receives the inverter control data through the external apparatus.

The data transfer apparatus 20 and the external apparatus may communicate in a wired or wireless manner to transmit or receive the inverter control data.

For example, the data transfer apparatus 20 may communicate with the external apparatus in a wired manner using any one communication module of RS-232, RS-485, and USB.

Alternatively, the data transfer apparatus 20 may be connected and communicate with the external apparatus according to communication standards of Bluetooth, Radio Frequency Identification (RFID), Infrared Data Association (IrDA), Ultra Wideband (UWB), ZigBee, and Digital Living Network Alliance (DLNA).

Alternatively, the data transfer apparatus 20 is connected and communicates with the external apparatus via Ethernet ports.

Alternatively, the data transfer apparatus 20 may be connected and communicate with the external apparatus according to communication standards of Wireless LAN (WLAN), Wi-Fi, Wireless broadband (Wibro), World Interoperability for Microwave Access (Wimax), and High Speed Downlink Packet Access (HSDPA).

Figure 2:
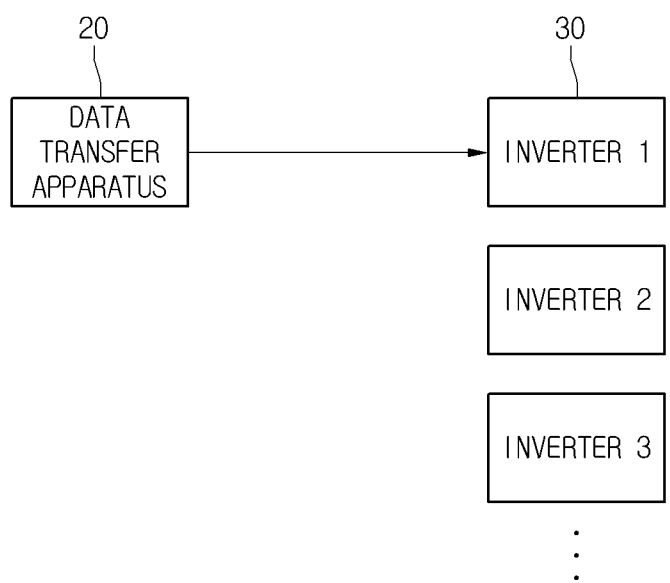
FIG. 2 is a view illustrating a method of transmitting inverter control data to inverters 30 by using a data transfer apparatus 20 according to an embodiment of the invention.

FIG. 2 is a view illustrating a method of transmitting the inverter control data to inverters 30 by using the data transfer apparatus 20 according to an embodiment of the invention.

The data transfer apparatus 20 receives and then stores the inverter control data through the external apparatus connected thereto.

Upon storing the inverter control data in the data transfer apparatus 20, the data transfer apparatus 20 is connected with inverters 30 as illustrated in FIG. 2 and delivers to the inverters 30 the inverter control data which is received from the external apparatus.

The data transfer apparatus 20 is equipped with a separate portable power supply apparatus, for example, a battery.

In general, in order to transfer setting values and firmware to an inverter, a driving power should be supplied to the inverter through a separate power supply apparatus.

In an embodiment of the present invention, however, the data transfer apparatus 20 having the battery supplies power to the inverter, and thus the inverter can transmit or receive the inverter control data without the separate power supply apparatus connected thereto.

Figure 3:
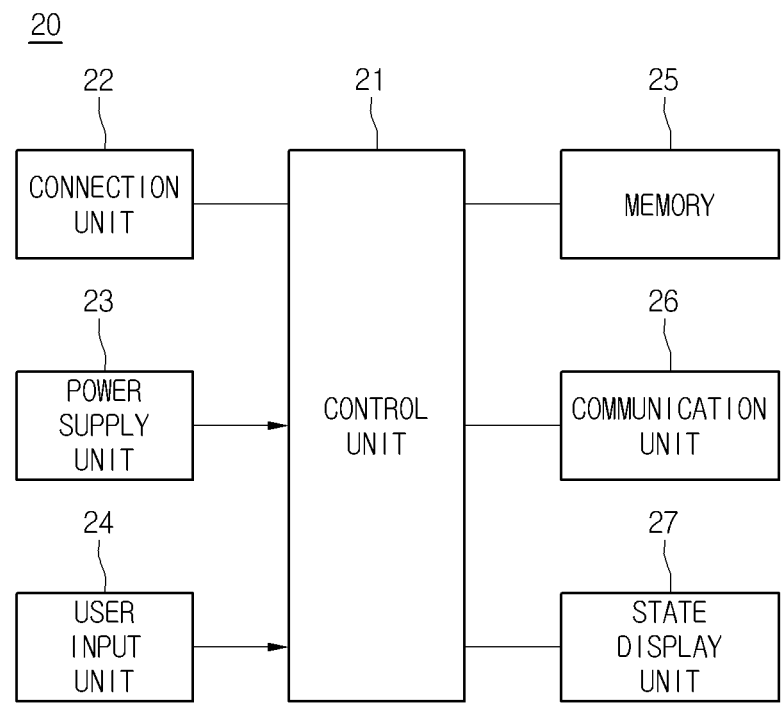
FIG. 3 is a view illustrating a configuration of the data transfer apparatus 20 according to an embodiment of the present invention.

FIG. 3 is a view illustrating a configuration of the data transfer apparatus 20 for controlling an inverter according to an embodiment of the present invention.

As Illustrated in FIG. 3, the data transfer apparatus according to an embodiment of the present invention includes a communication unit 26 connected with an external apparatus and downloading inverter control data, a memory 25 storing the downloaded inverter control data therein, a power supply unit 23 being rechargeable and supplying operation power, and a connection unit 22 connected to the inverter to provide the inverter control data stored in the memory 25 and power supplied by the power supply unit 23 to the inverter.

The external apparatus may be a PC 10 as illustrate in FIG. 1 or another electronic apparatus.

The communication unit 26 is connected to the external apparatus, which may be one of RS-232, RS-485, and USB module. That is, the data transfer apparatus 20 and the external apparatus, for example, the PC 10 are connected each other by RS-232, RS-485, or USB.

Alternatively, the communication unit 26 may be any one of a near field communication module, a cable network module, and a wireless network module. That is the data transfer apparatus 20 and the external apparatus may be connected using any one of near field communication standards such as Bluetooth, Radio Frequency Identification (RFID), Infrared Data Association (IrDA), Ultra Wideband (UWB), ZigBee, and Digital Living Network Alliance (DLNA), cable network standards such as Ethernet, and wireless network standards such as Wireless LAN (WLAN), Wi-Fi, Wireless broadband (Wibro), World Interoperability for Microwave Access (Wimax), and High Speed Downlink Packet Access (HSDPA).

Furthermore, the data transfer apparatus 20 may further include a user input unit 24 receiving a user input for operation instruction.

Using the user input unit 24, a user may allow the data transfer apparatus 20 to receive data from an external apparatus.

Moreover, using the user input unit 24, a user may allow the data transfer apparatus 20 to transmit data such as setting values to the inverter 30.

Moreover, using the user input unit 24, a user may allow the inverter 30 to update firmware.

Moreover, using the user input unit 24, a user may allow the power supply unit included in the data transfer apparatus 20 to be rechargeable.

As described below, the user input unit 24 may be a plurality of buttons disposed outside the data transfer apparatus 20.

The data transfer apparatus 20 may further include a state display unit 27 for displaying an operation state of the data transfer apparatus 20.

The state display unit 27 displays information regarding a state of operation currently performed by the data transfer apparatus 20, thus enabling a user to recognize which operation is currently performed in the data transfer apparatus 20.

In this case, as described below, the state display unit 28 may be a plurality of LEDs.

Figure 4:
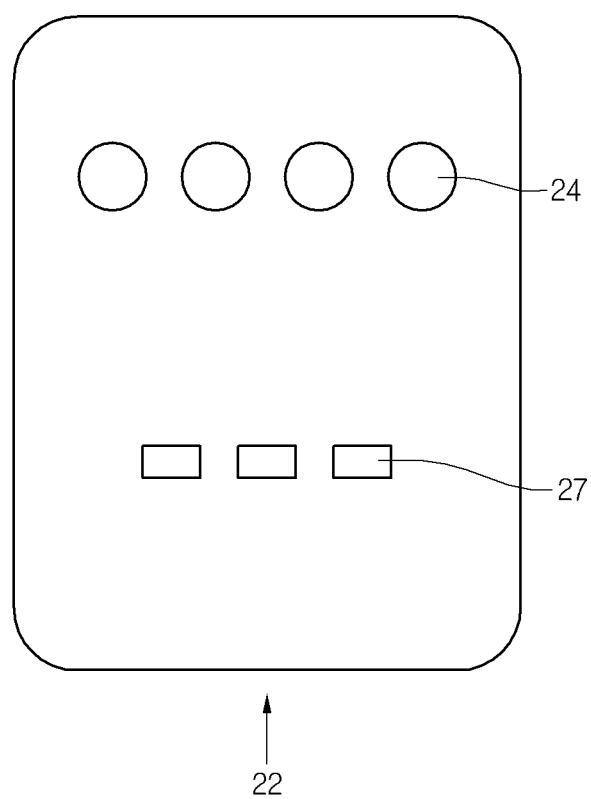
FIG. 4 is a view illustrating the appearance of the data transfer apparatus 20 according to an embodiment of the present invention.

FIG. 4 illustrates the appearance of the data transfer apparatus 20 according to an embodiment of the present invention.

As illustrated in FIG. 4, the user input unit 24 for receiving a user input may be disposed outside the data transfer apparatus 20.

As shown in FIG. 4, the user input unit 24 may be a plurality of buttons. Each button constituting the user input unit 24 may be a button for receiving data from an external apparatus, transferring data to an inverter, and charging a battery.

In addition, the state display unit 27 may be equipped outside the data transfer apparatus 20 and be a plurality of LEDs.

The plurality of LEDs may be assigned to states of operations, which may be performed by the data transfer apparatus 20, respectively, to emit light depending upon the operation state.

For example, the LEDs may include a first to fourth LEDs. When a battery is charged by the data transfer apparatus 20, only the fourth LED among the plurality of LEDs may emit light.

Moreover, a connection unit 22 for connecting with an external apparatus, inverter, or battery may be disposed at one side of the data transfer apparatus 20.

Figure 5:
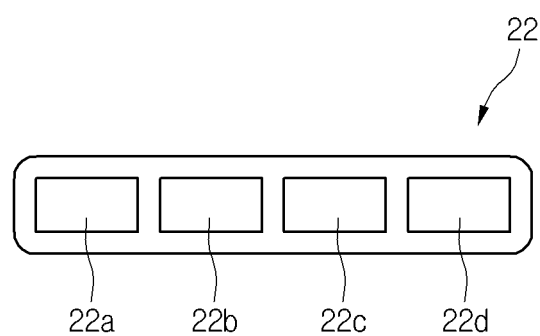
FIG. 5 is a view illustrating the arrangement of a connection unit 22 according to an embodiment of the present invention.

FIG. 5 illustrates the arrangement of connection unit 22 according to an embodiment of the present invention. As shown in FIG. 5, the connection unit 22 includes a plurality of connectors 22a, 22b, 22c, and 22d.

In this case, any one of the plurality of connectors 22a, 22b, 22c, and 22d is used for a battery charging cable.

Any one of the plurality of connectors 22a, 22b, 22c, and 22d may be used for connecting to other inverters under different downloading environments. That is, the inverters 30 have different download environments such as an electric voltage or pin map, and thus connectors of different types are required.

More specifically, connectors 22a and 22b may be connected to inverters, respectively, which may have different download environments to supply different voltages and have different pin maps according to kinds of inverters.

The connector 22c may be for a battery charging cable. The connector 22d may be for connecting with an external apparatus, for example a PC.

Figure 6:
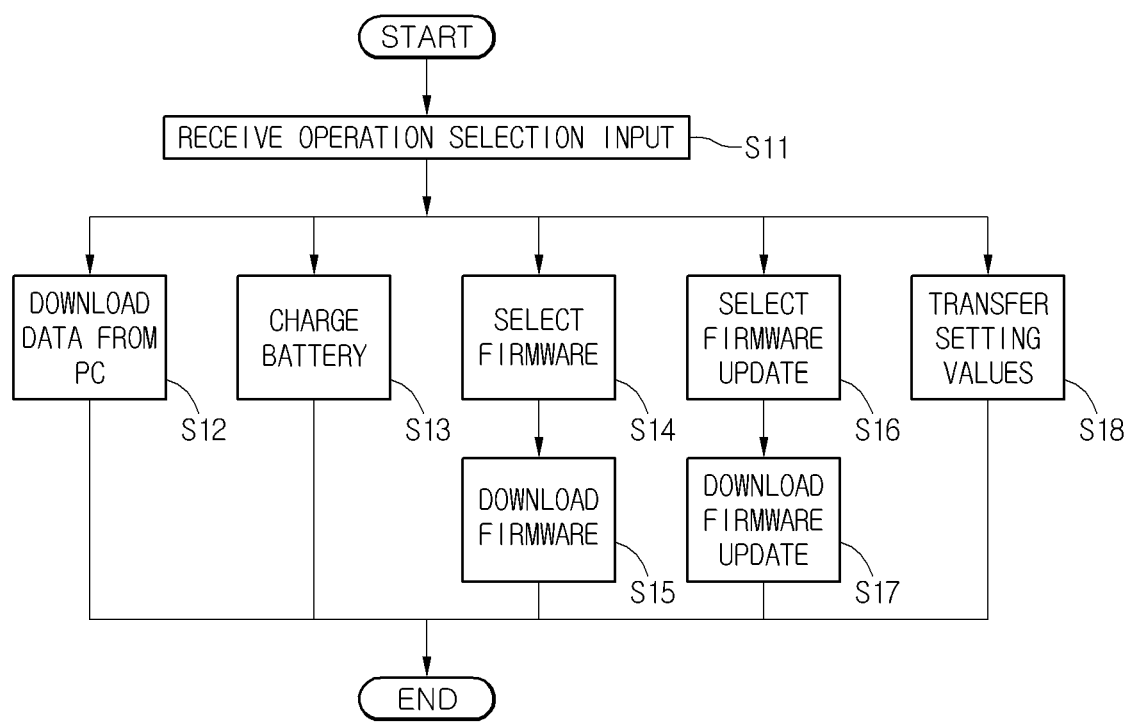
FIG. 6 is a flowchart illustrating operations of the data transfer apparatus 20 according to an embodiment of the present invention.

FIG. 6 is a flowchart illustrating operations of the data transfer apparatus 20 according to an embodiment of the present invention.

In S11, an operation to be performed by the data transfer apparatus 20 is input from a user. The user input may be input via the user input unit 24 described above, that is, a plurality of buttons included in the data transfer apparatus 20. Subsequently, the data transfer apparatus 20 transfers data according to the operation selected by the user.

That is, if the selected button is a first button (an operation button for downloading data from an external apparatus such as a PC), the data transfer apparatus 20 communicates with the PC to download data (S12).

As described above, the downloaded data is inverter control data, which includes setting values, for example, a frequency command value, a speed command value, driving type information, firmware data, and firmware update data, which are required to be set before the use of an inverter.

If the selected button is a second button (an operation button for charging a battery), the data transfer apparatus 20 charges a battery (S13).

If the selected button is a third button (an operation button for transferring firmware data), the data transfer apparatus 20 receive the selection of firmware to be transferred to an inverter from among previously stored firmwares (S15).

Upon selecting the firmware data to be transferred, the data transfer apparatus 20 transfers the selected firmware data to the inverter. The transferred firmware data is installed in the inverter.

If the selected button is a fourth button (an operation button for updating firmware), the data transfer apparatus 20 receives the selection of firmware to be updated from a user (S16), and then transfers the selected firmware to an inverter (S17).

If the selected button is a fifth button (an operation button for transferring setting values of an inverter), the data transfer apparatus 20 transfers setting values to an inverter (S18).

Among the operations described above, the operation of transferring firmware or data to the inverter is performed through a cable connected to the inverter.

In such operation, the data transfer apparatus 20 supplies a voltage for driving the inverter through the cable.

Accordingly, the inverter can receive a driving power through the data transfer apparatus 20 and thus be driven by the supplied power to perform the operations described above even when the inverter is not connected to a separate power apparatus.

In an embodiment of the present invention, setting values can be transferred or received to or from an inverter even when the inverter is powered off. In an embodiment of the present invention, firmware can be downloaded to the inverter powered off, thereby performing the maintenance of the inverter conveniently in various environments.

In an embodiment of the present invention, setting values can be set to even a plurality of inverters powered off, and thus manufacturers of inverters can reduce the setting time of the products.

Thus, according to the embodiments of the present invention, an error occurring time during the operation setting of an inverter can be reduced, thereby enhancing the reliability of the inverter.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A data transfer apparatus, comprising:
a power supply unit supplying operation power;
a communication unit downloading inverter control data from a connected external apparatus;
a memory storing the downloaded inverter control data;
at least one connection unit connected to at least one inverter;
a control unit controlling the at least one connection unit to provide the supplied operation power and the stored inverter control data to the at least one connected inverter when the at least one inverter is connected; and
an input unit receiving a user input for operating the data transfer apparatus, the input unit comprising at least a mechanism for:
performing a charging operation of the power supply unit;
updating firmware; and
transferring setting values of the at least one connected inverter.

2. The data transfer apparatus of claim 1, wherein the at least one connected inverter is driven by the supplied operation power.

3. The data transfer apparatus of claim 1, wherein the inverter control data comprises at least a frequency command value, a speed command value, a driving type, firmware data of the at least one inverter or firmware update data of the at least one inverter.

4. The data transfer apparatus of claim 1, wherein the communication unit is a communication module comprising at least Bluetooth™, Radio Frequency Identification (RFID), Infrared Data Association (IrDA), Ultra Wideband (UWB), ZigBee™, Digital Living Network Alliance (DLNA), Ethernet, Wireless LAN (WLAN), Wi-Fi, Wireless broadband (Wibro), World Interoperability for Microwave Access (Wimax) or High Speed Downlink Packet Access (HSDPA).

5. The data transfer apparatus of claim 1, further comprising a plurality of connection units connected with a plurality of inverters, each of the plurality of communication units having environments for downloading the corresponding inverter control data.

6. The data transfer apparatus of claim 1, wherein the input unit further comprises a mechanism for performing a transfer of the stored inverter control data to the at least one connected inverter.

7. The data transfer apparatus of claim 6, wherein the control unit:
receives selection of inverter control data from the stored inverter control data; and
provides the selected inverter control data to the at least one connected inverter.

8. The data transfer apparatus of claim 6, further comprising a display unit displaying an operation state of the data transfer apparatus according to the received user input.

9. The data transfer apparatus of claim 8, wherein:
the display unit comprises a plurality of LEDs; and
the control unit illuminates one of the plurality of LEDs corresponding to the operation state of the data transfer apparatus.

10. A data transfer method of a data transfer apparatus, the method comprising:
supplying operation power from a power supply unit for driving an inverter connected to the data transfer apparatus;
providing inverter control data to the connected inverter in response to an input to an input unit of the data transfer apparatus; and
receiving an external command corresponding to an execution operation,
wherein the execution operation comprises at least updating firmware, transferring a setting value of the connected inverter, or performing a charging operation of the power supply unit.

11. The data transfer method of claim 10, further comprising downloading the inverter control data from an external apparatus.

12. The data transfer method of claim 10, wherein the inverter control data comprises at least a frequency command value, a speed command value, a driving type, firmware data of the inverter or firmware update data of the inverter.

13. The data transfer method of claim 10, further comprising receiving selection of the inverter control data to be provided to the connected inverter, the selected inverter control data corresponding to the execution operation.

14. The data transfer method of claim 10, further comprising displaying information related to the execution operation.

* * * * *